ature patent Office 3,300,415
Patented Jan. 24, 1967

3,300,415
EPOXY DIOXANES AND CURED POLYMERS
OBTAINED THEREFROM
Calvin F. Ward, Carmichael, Calif., assignor to The Dow
Chemical Company, Midland, Mich., a corporation of
Delaware
No Drawing. Filed Feb. 18, 1963, Ser. No. 259,442
13 Claims. (Cl. 260—2)

This invention relates to new compositions of matter and to methods for their preparation. More particularly, the present invention relates to polyethers which contain heterocyclic oxygen-containing substituents and to processes for the manufacture of such compounds.

The compounds of this invention are characterized by the presence of both an epoxy

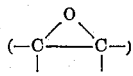

group and a 1,4-dioxane ring

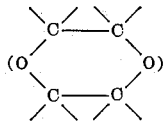

in the molecule. Each epoxy group and each dioxane group is linked to a different ether-oxygen atom via a carbon atom or chain of carbon atoms. For convenience, these compounds are referred to as epoxy-dioxanyl polyethers. The compounds may contain from 10 to 350 carbon atoms and from 5 to 50 oxygen atoms.

A preferred subclass of these compounds may be represented by the following structural formula:

(I) 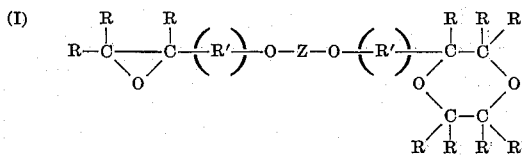

wherein R′ is an alkylene group of from 1 to 6 carbon atoms (such as a methylene, lower alkyl-substituted methylene, ethylene, or propylene group), Z is an organic group of from 2 to 300 carbon atoms, and each R may be hydrogen or a monovalent organic group of from 1 to 10 carbon atoms.

In the above formula, Z may be an alkylene group of from 2 to 10 carbon atoms, such as ethylene, propylene, butylene, pentylene, hexylene, heptylene, octylene, nonylene, or decylene. Z may be a cycloalkylene group with from 4 to 8 carbon atoms, such as unsubstituted or lower alkyl-substituted cyclobutylene, cyclopentylene, and cyclohexylene. The portion of the molecule represented by —O—Z—O— may be derived from the corresponding glycol HO—Z—OH wherein Z is an alkylene group of from 2 to 10 carbon atoms. Suitable dihydric alcohols include ethylene glycol, propylene glycol, 1,3-butanediol, as well as α,ω-alkanediols. The group —O—Z—O— may also be derived from the corresponding polyalkylene glycols such as polyethylene glycols, polypropylene glycols, and polybutylene glycols with up to 300 carbon atoms. Suitable Z groups include the divalent group $$-(C_nH_{2n}O)_x-C_nH_{2n}-$$

derived from the corresponding polyalkylene glycol of the type:

$$HO(C_nH_{2n}O)_{x+1}-H$$

wherein $n$ is any integer from 2 to 4 inclusive (for each $x$) and $x$ is an integer from 1 to 40 inclusive. Thus, the formula represents diethylene glycol when $x$ is one and $n$ is two. Mixed alkylene glycols (such as are obtained by condensing ethylene oxide with polypropylene glycol) are also suitable glycols. The group —O—Z—O— may also be derived from polypropylene glycol. For example, when $x$ is 33 said polypropylene glycol has a molecular weight of about 2000. Other suitable —O—Z—O— groups include those derived from alkylidene bisphenols:

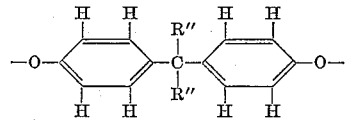

wherein R″ is a lower alkyl, such as the group derived from bisphenol-A wherein R is methyl and the corresponding group derived from tetrachloro-bisphenol-A (4,4′-isopropylidene-bis(2,6-dichlorophenol)). Z may be an arylene group of from 6 to 20 carbon atoms such as phenylene (derived from catechol), an alkyl-substituted phenylene wherein the alkyl group is a lower alkyl of from 1 to 4 carbon atoms such as a tolylene group and 4-tert. butylphenylene (derived from 4-tert.-butyl-catechol). The —O—Z—O— group may be derived from the corresponding symmetrical or unsymmetrical dialkanolamines wherein each alkanol moiety contains from 1 to 4 carbon atoms (such as diethanolamine, ethanolpropanolamine, N,N′-di-(2-hydroxyethyl)-ethylenediamine, and dibutuanolamine, usually employed in the hydrogen halide salt form.

When R is an organic group of from 1 to 10 carbon atoms, R may be an alkyl, aryl, alkenyl, or cycloaliphatic hydrocarbon group. Examples of such groups include methyl, ethyl, n-propyl, i-propyl, i-butyl, n-butyl, sec.-butyl, tert.-butyl, pentyl, hexyl, heptyl, octyl, nonyl, decyl, phenyl, duryl, naphthyl, tolyl, xylyl, cyclopentyl, 1-methyl-2-ethylcyclopentyl, cyclohexyl, cyclohexenyl, 3-hexenyl, 5-octenyl, phenethyl, cumyl, and benzyl groups. R is preferably a hydrogen atom or a lower alkyl group of from 1 to 4 carbon atoms.

R′ is preferably a methylene group or lower alkyl substituted methylene group

wherein R is hydrogen or a lower alkyl.

The compounds of the present invention are conveniently prepared by reacting a bishalohydrin with an alkylene oxide followed by ring closure of the resulting intermediate by treatment with a base. The bishalohydrins are obtained by reacting any diol (such as the diols from which the —Z— group is derived) with an epihalohydrin. The reactions may be represented by the following equations:

(1)

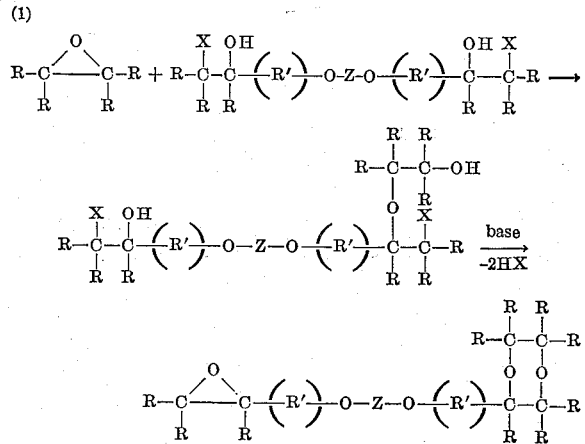

wherein X represents a halogen (preferably Cl, Br) and R, R', and Z are as previously defined for Formula I. Specific examples of the process may be illustrated by the following equations:

(2)

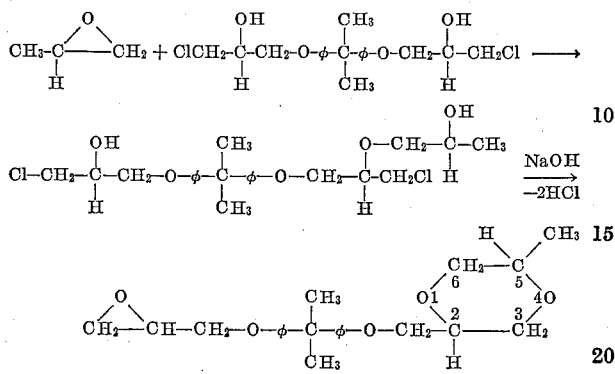

wherein —φ— represents a phenylene (—C$_6$H$_4$—) group.

[The glycidyl 5-methyl-1,4-dioxan-2-ylmethyl diether of bisphenol–A]

With ethylene oxide, the glycidyl 1,4-dioxan-2-ylmethyl diether of bisphenol-A is obtained.

(3)

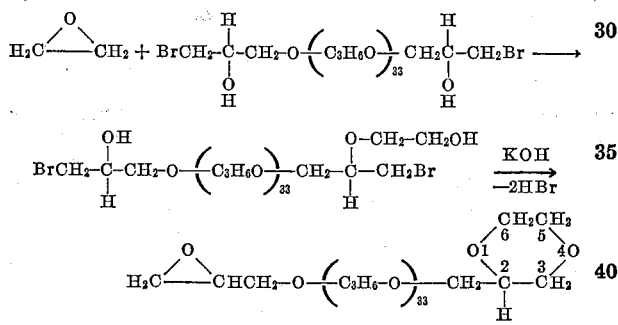

[The glycidyl 1,4-dioxan-2-ylmethyl diether of polypropylene glycol]

(4)

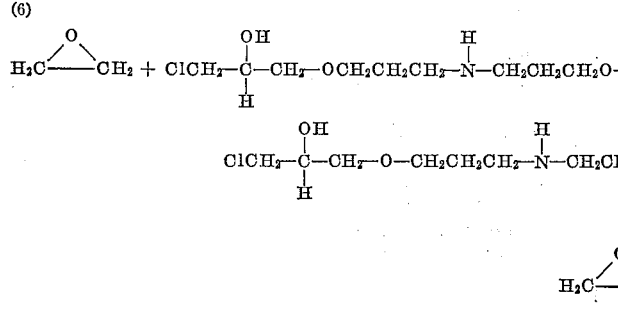

(6)

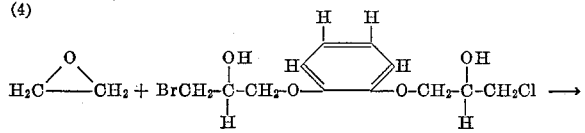

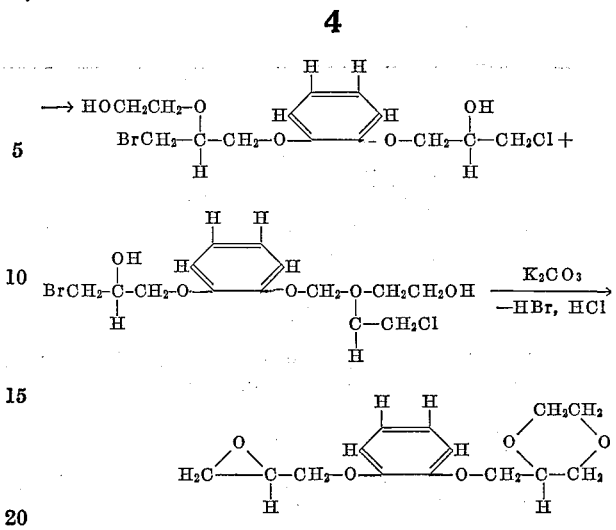

[The glycidyl 1,4-dioxan-2-ylmethyl diether of pyrocatechol]

(5)

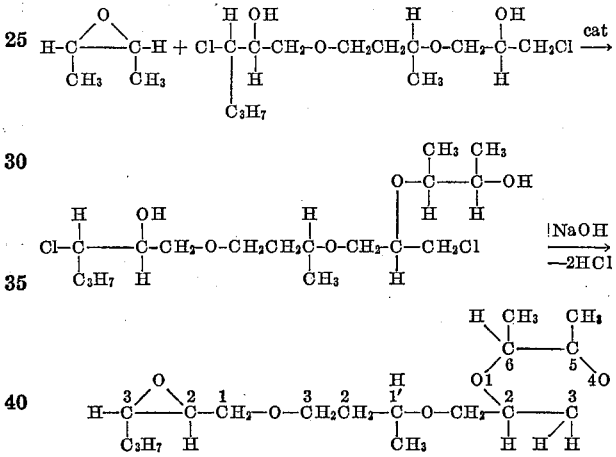

[2 - (3 - ( - 2 - 3 - epoxyhexoxy) - 1 - methyl - propoxymethyl)-4,6-dimethyl-p-dioxane (the 2,3-epoxy-hexyl 5,6-dimethyl-1,4-dioxan-2-ylmethyl diether of 1,3-butanediol)]

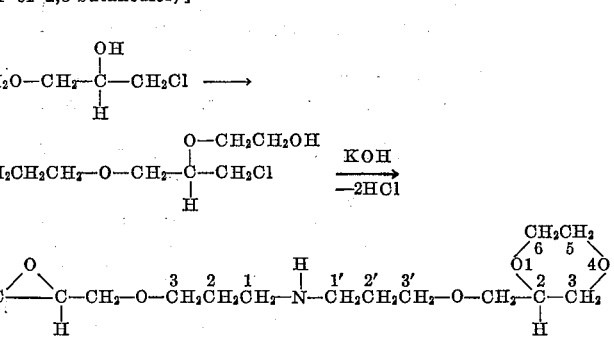

[3-(2,3-epoxypropoxy)-3'-(p-dioxan - 2 - ylmethoxy) dipropylamine (the glycidyl 1,4-dioxan-2-ylmethyl diether of dipropanolamine)]

With primary and secondary alkanolamine-epihalohydrin condensation products, it is preferable to use the hydrochloride salt in order to prevent reaction of the epoxide with the amino hydrogen.

The bishalohydrin polyether starting materials which are condensed with the alkylene oxide in the process of the present invention may be prepared by reacting about two moles of a halogenated epoxy compound with a diol according to the reaction:

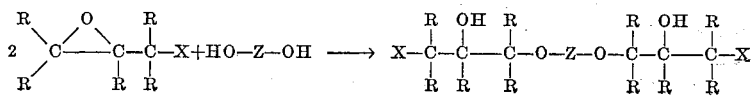

wherein each of X, —Z— and R are as previously defined in Formula I.

These bishalohydrin polyethers are then reacted with any suitable alkylene oxide to form the oxyalkylated dihydroxy intermediates which are subsequently cyclized with a base. While a catalyst is not necessary for the reaction to go, the alkylene oxide-bishalohydrin condensation is generally carried out in the presence of a Lewis acid or a suitable complex (preferably an ethereate) of a Lewis acid. Examples of such catalysts include $BF_3$, $BF_3$ etherate, $ZnCl_2$, $SnCl_4$, $AlCl_3$, $BCl_3$, $FeCl_3$, etc. Only a catalytic amount of Lewis acid operates to accelerate the condensation. Generally, amounts of acid from 0.1 percent by weight to 2 percent by weight (based upon the weight of epihalohydrin reactant) are sufficient. The reaction may be carried out at temperatures of from 5° C. to 50° C., with a temperature of about 40° C. being preferred. The condensation may be accomplished at any pressure of from about 0.1 atmosphere up to about 100 atmospheres. Generally, atmospheric pressure is sufficient. Stoichiometric amounts of alkylene oxide and dihalohydrin are condensed (essentially 1:1 mole ratios, with up to a ten mole percent variation in the amount of alkylene oxide).

The final ring closure step is accomplished by splitting out hydrogen halide from the alkylene oxide-dihalohydrin condensation product with any suitable base. This step may be performed on the condensation product in situ by merely adding a base to the reactor. The ring closure step may be carried out at any temperature of from 40° C., to 90° C., with temperatures of from 50° C. to 65° C., being preferred. The ring closure step is generally carried out at about atmospheric pressure. No process advantages are obtained by using higher pressures. Suitable bases which may be employed include alkali metal and alkaline earth metal (Mg, Ca) hydroxides, carbonates, and oxides. At least one mole of base per mole of hydrogen halide is employed. A large excess of base may be used without causing substantial side reactions.

The epoxy dioxane compounds of the present invention are useful as starting materials in the preparation of solid polymers. The polymers may be used as coating materials, adhesives and in the preparation of laminated articles. The compounds are polymerized by adding from 1 to 35 percent by weight of a conventional curing agent such as a primary, secondary, or tertiary amine (for example, dialkyl and trialkyl amines of up to 30 carbon atoms and polyalkylene polyamines of up to 30 carbon atoms with up to 7 nitrogen atoms, such as dialkylenetriamines). Any compound having a reactive hydrogen or a basic group may be used to form the polymers. Suitable acidic agents include carboxylic acids and anhydrides, such as succinic, maleic and phthalic acids and anhydrides.

The following examples are submitted for the purpose of illustration only and are not to be construed as limiting the scope of the invention in any way.

*Example I*

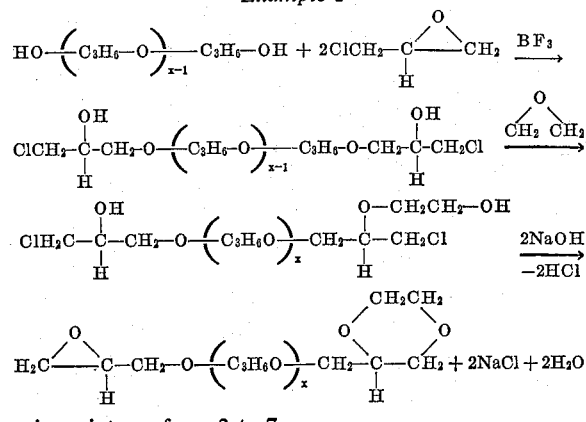

$x$ is an integer from 3 to 7.

Into a reaction vessel equipped with a means for stirring and temperature control were placed 172.8 grams of polypropylene glycol having a molecular weight of about 400 and 127.2 grams of epichlorohydrin (added dropwise over a 50 minute period while maintaining the temperature at 40° C.). The catalyst employed in this step was 0.7 gram of boron trifluoride etherate complex consisting of 48 percent $BF_3$ in diethyl ether. Upon completion of the addition of epichlorohydrin, the mixture was digested at 45° C. for one hour. The temperature was then lowered to 10° C. and 19.5 grams of ethylene oxide were added dropwise over about a one hour period. After the addition of the ethylene oxide, the mixture was digested for one-half hour, the temperature was then increased to 40° C., and the digestion was continued for an additional hour. At the end of the digestion period, 70.88 grams of flake sodium hydroxide were added and the reaction mixture was stirred for 24 hours at 60° C. The product was taken up in normal butanol and filtered. The normal butanol was removed by reducing the pressure to 3 mm. of mercury and maintaining the temperature at 100° C. for 20 minutes. The product was then filtered to remove the salt formed in the ring-closing step. The final product (the glycidyl 1,4-dioxan-2-ylmethyl ether of polypropylene glycol) had the following properties:

Refractive index at 24° C. _____ 1.388
Oxirane oxygen _____percent__ [1] 2.35
Hydroxyl _____percent__ 0.2
Viscosity at 210° F. _____centistokes__ 3.6

[1] Theory=2.46 percent.

The product was readily polymerized to a solid by mixing one part of diethylene triamine with 3.5 parts of the above epoxy dioxane.

*Example II*

Dipropylene glycol-bis(chlorohydrinether) was prepared in a manner similar to that shown in Example I by reacting dipropylene glycol with epichlorohydrin.

Into a reaction vessel equipped with a means for stirring and temperature control were placed 200 grams of the dipropylene glycol diether, 2 grams of $BF_3$ etherate catalyst (prepared as in Example I) and the temperature was lowered to 10° C. To this mixture 21 grams of ethylene oxide was added dropwise. Upon completion of the addition, the mixture was digested for one hour at 40° C. To the digested mixture 152 milliliters of 30 percent sodium hydroxide were added and the heat was increased to 80° C. for a two hour period. At the end of this time the mixture was devolatilized at 100° C. at 2 mm. of mercury and filtered. The product (the glycidyl 1,2-dioxan-2-ylmethyl diether of dipropylene glycol) had oxirane oxygen equal to 2.80 percent.

I claim as my invention:

1. Epoxy-dioxanyl ethers of from 10 to 350 carbon atoms characterized by the presence of an oxirane group and a 1,4-dioxane ring in the molecule, each epoxy group and each dioxane group being linked to a different ether-oxygen atom via a carbon atom or chain of carbon atoms.

2. Compounds of the formula

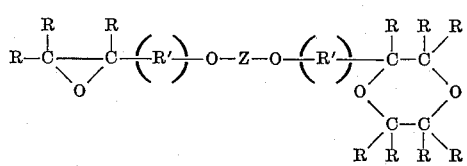

wherein R' is an alkylene group of from 1 to 6 carbon atoms, Z is a divalent organic group of from 2 to 300 carbon atoms selected from the group consisting of
    (a) an alkylene group of 2 to 10 carbon atoms,
    (b) a cycloalkylene group of 4 to 8 carbon atoms, (c) a polyoxyalkylene radical havng up to 300 carbon atoms wherein each oxyalkylene group has 2 to 4 carbon atoms,
(d) the residue of an alkylidene bisphenol remaining after removal of the two phenolic hydroxyl groups,
(e) an arylene group having 6-20 carbon atoms, and
(f) the residue of a dialkanolamine remaining after removal of the two hydroxyl groups and each R is selected from the group consisting of hydrogen and hydrocarbon radicals of from 1 to 10 carbon atoms.

3. Compounds according to claim 2 wherein Z is an arylene group of from 6 to 20 carbon atoms.

4. Compounds according to claim 2 in which Z is the group $$-(C_nH_{2n}O)_x-C_nH_{2n}-$$

wherein $x$ is an integer from 1 to 40 and (for each $x$) $n$ is an integer from 2 to 4.

5. Compounds accordng to claim 2 wherein Z is an alkylene group of from 2 to 10 carbon atoms and R' is a methylene group.

6. The glycidyl 1,4-dioxan-2-ylmethyl diether of polyalkylene glycol.

7. The glycidyl 1,4-dioxan-2-ylmethyl diether of dipropylene glycol.

8. A process for the preparation of epoxy dioxanyl polyethers which comprises (a) reacting a diol with an epihalohydrin to produce a bishalohydrin polyether, (b) reacting said bishalohydrin polyether with about an equimolar amount of alkylene oxide, and (c) reacting said oxyalkylated intermediate with a base selected from the group consisting of the alkali and alkaline earth metal oxides, hydroxides and carbonates, thus to split out hydrogen halide and effect a ring closure at each of the halohydrin sites.

9. The process of claim 8 wherein the diol is polypropylene glycol, the alkylene oxide is ethylene oxide and the epihalohydrin is epichlorohydrin.

10. The polymer obtained by mixing the glycidyl 1,4-dioxan-2-ylmethyl ether of polypropylene glycol with an amine curing agent.

11. Compounds according to claim 2 wherein Z is the 4,4'-isopropylidenediphenylene radical.

12. The process of claim 8 wherein Step (a) is conducted in the presence of a Lewis acid catalyst at a temperature of 5-50° C.

13. The polymer of claim 10 wherein the proportion of the amine is 1-35% by weight.

No references cited.

SAMUEL H. BLECH, *Primary Examiner.*

WILLIAM H. SHORT, *Examiner.*

T. PERTILLA, *Assistant Examiner.*